United States Patent [19]

Lawley

[11] Patent Number: 5,919,499
[45] Date of Patent: Jul. 6, 1999

[54] AIDING FERMENTATION DIGESTION AND METABOLISM IN MAMMALS

[75] Inventor: C. Murrell Lawley, Modesto, Calif.

[73] Assignee: Lawley, Inc., Modesto, Calif.

[21] Appl. No.: 08/808,477

[22] Filed: Mar. 3, 1997

[51] Int. Cl.$^6$ ..................................................... A23L 1/305
[52] U.S. Cl. .................................. 426/2; 426/72; 424/442
[58] Field of Search ................................. 426/2, 580, 72; 424/442

[56] References Cited

U.S. PATENT DOCUMENTS

| | | |
|---|---|---|
| 3,670,080 | 6/1972 | Hirata . |
| 3,879,511 | 4/1975 | Goodhart .................................. 426/35 |
| 3,961,079 | 6/1976 | Hellberg . |
| 4,042,716 | 8/1977 | Bertram et al. . |
| 4,186,213 | 1/1980 | Borroughs et al. . |
| 4,482,550 | 11/1984 | Pais et al. . |
| 5,518,730 | 5/1996 | Fuisz . |
| 5,646,178 | 7/1997 | Walker ................................... 514/456 |
| 5,670,513 | 9/1997 | Schmidt ................................. 514/297 |
| 5,712,290 | 1/1998 | Schmidt ................................. 514/311 |
| 5,719,189 | 2/1998 | Schmidt ................................. 514/649 |

FOREIGN PATENT DOCUMENTS

| | | |
|---|---|---|
| 53-041427 | 4/1978 | Japan . |
| 7405003 | 10/1974 | Netherlands . |
| 9002013 | 4/1992 | Netherlands . |
| 74418 | 11/1980 | Romania . |
| 74505 | 6/1981 | Romania . |
| 2054287 | 2/1996 | Russian Federation . |
| 2054288 | 2/1996 | Russian Federation . |
| 2054289 | 2/1996 | Russian Federation . |
| 2054287 | 1/1992 | U.S.S.R. . |

OTHER PUBLICATIONS

Aziz 1985 Antimicrobial Growth Promoting & Egg Production Effects of Hexamethylenetetramine–Hydrorhodenide Vet Med J 33(1) 269–277.

Restani 1992 Formaldehyde & Hexamethylenetetramine as Food Additives: Chemical Interactions & Toxicology Food Additives and Contaminants 9(5) 597–605.

Schmidt 1973 J Animal Science 37(5) 1238–45.

Restani 1992 Food Addit. Contam. 9(5) 597–605.

Aziz 1985 Vet Med J. 33(1) 269–277.

Methenamine: Health Library, Thrive at Health—dated Jan. 21, 1998—4 pages.

Hexamine—Tech—dated Jan 21, 1998—1 page.

S.P. Schmidt, N.J. Benevenga and N.A. Jorgensen, "Effects of Formaldehyde, Glyoxal, or Hexamethylenetetramine Treatment of Soybean Meal on Nitrogen Utilization and Growth in Rats and In Vitro Rumen Ammonia Release", *Journal of Animal Science*, vol.37, No.5, 1973, pp. 1238–1245.

German Article: Jurgen Voigt, Siegfried Nage, Klaus–Dieter Robowski, Rudiger Krawielitzki and Gunter Schulz, Der Einflub des Zusatzes von Cellulase Bei der Silierung von Grunfutter auf Nahrstoffumastaz und Kauverhalten bei Wiederkauern, Arch. Tierz., Dummerstorf 34: 457–468 (1991).

*Primary Examiner*—Carolyn Paden
*Attorney, Agent, or Firm*—Knobbe, Martens, Olson & Bear, LLP

[57] ABSTRACT

A method is provided for enhancing digestion, growth, production and health and for preventing disease in a ruminant or other animal or man comprising feeding methenamine in dry solid or powder form to the animal or man. A method is provided for enhancing digestion, growth, production and health and for preventing disease in a ruminant or other animal or man comprising the addition of methenamine in dry solid or powder form to a food or nutrient supplement and feeding the food or nutrient supplement to the animal or man. Compositions comprising methenamine are provided for nutritional supplementation employing the methods. A method employing methenamine for preserving storage stability and taste of milk, cream, cheese, yogurt and other dairy products is provided. Dairy product compositions comprising methenamine for preserving the dairy products are provided.

6 Claims, No Drawings

AIDING FERMENTATION DIGESTION AND METABOLISM IN MAMMALS

FIELD OF THE INVENTION

This invention relates to a method employing methenamine for enhancing digestion, growth, production and health and for preventing disease in an animal or man comprising feeding methenamine in dry solid or powder form to said animal or man, compositions comprising methenamine for nutritional supplementation for an animal or man employing said method, a method employing methenamine for preserving milk and other dairy products and dairy product compositions comprising methenamine for preserving said dairy products.

BACKGROUND OF THE INVENTION

There exists great diversity in the digestive systems of animals. Animals such as cattle, sheep, buffalo and goats are ruminant species which have four stomach compartments. The first compartment is the rumen, and the fourth is the abomasum, the true stomach. The other compartments play no true role in the digestive system. Rumens contain large populations of beneficial microorganisms. The ruminal microorganisms break down the feeds eaten by the host animal and utilize the resulting products such as nitrogen and ammonia as nutrients for their own growth and multiplication (cell division). Ruminal microorganisms later pass into the abomasum and intestines of the animal to become food for their host. These foods produce growth, weight gains, milk, milk proteins, milk fat, or butter fat and if the host is sheep the production of wool is also helped by diet.

Ruminal microorganisms are anaerobic bacteria which are susceptible to oxygen which is detrimental to their growth and multiplication. The atmosphere of the rumen thus has a direct effect on ruminal bacteria. The presence of oxygen in the rumen will result in poor digestion of various feeds such as grains, hay, silage, pasture, straw, cannery and gin waste, and paper.

Ruminants have long been thought to have the ability to convert enough of the crude foods they consume into microbial proteins to fully support and sustain themselves and produce plentiful food products such as meat and milk. It has been proven, however, that this is far from the truth. Many of the feeds provided these animals either do not contain complete proteins and/or may be poorly digested by the animals. Currently, if one walks through animal corrals, kicking the tops off manure piles, one will observe a large amount of undigested grain. There will also be a large amount of undigested hay and silage, which is harder to see. Some dairies have pig pens at the bottom ends of their flush lanes from the milking parlor and holding pens, because of the large amount of grain undigested by the ruminant animals.

A variety of animal feeds have been developed and continue to be developed to address this problem which has not been completely solved. Accordingly, there is still a need for an improved ruminant feed or nutritional supplement which will provide for a more complete digestion and utilization of nutrients.

Animals with cecums, an enlarged part of the intestines located next to the colon, also have a large population of beneficial microorganisms, making it possible for them to eat grain, hay, pasture or range grass. Rabbits, hamsters and guinea pigs are animals with cecums.

Animals such as the horse also have the cecum digestive system, which contains microorganisms but in much less numbers than in the ruminant. These animals can live on grass, hay and straw, but must eat almost continuously because so much undigested feed passes through them.

The simplest digestive system of all consists of the mouth, associated glands, esophagus, stomach, small intestine, large intestine, pancreas and liver. This is the type of gastrointestinal tract found in the pig, dog, mink, fish, monkey and man. It has limited capacity and limited microbial action and fiber digestion. Animals with the most simple digestive systems such as man also more completely digest and utilize all the nutrients from the foods they eat, if properly supplemented, resulting in better health, more frame and muscle growth, more energy and stamina.

Various feeds have been developed and continue to be developed for animals with cecums as well as horses. A large variety of nutritional supplements have been developed and continue to be developed for man. This continuing effort is a result of the present situation wherein these nutritional needs are also not fully met by existing feeds and supplements. Accordingly, there remains a need for an improved nutritional supplement for both animals and man.

Compositions and methods employing methenamine, also known as hexamethylenetetramine, are known in the related art.

Hirata, U.S. Pat. No. 3,670,080 discloses a process for stabilization of compositions of 2a, 3a-epithio-androstanes and compositions obtained thereby employing a basic substance as a stabilizer to prevent acid and heat induced degradation of the androstane. Methenamine is included in a lengthy list of optional basic substances. One example was disclosed employing methenamine to prevent degradation of the androstane. The compositions of '080 are used for treatment of a variety of human or animal conditions demanding anabolic agents.

Hellberg, U.S. Pat. No. 3,961,079 discloses methods and compositions for ensiling animal fodder employing a mixture of hexamethylenetetramine and sodium nitrite. The purpose of the chemical additives is to produce a selective preservative/bacterial static action, so as to promote fermentation processes producing lactic acid, but suppress the growth of butyric acid producing bacteria. The main object of such inventions is to provide ensilage compositions resulting in a low production of undesired products such as butyric acid, acetic acid and ammonia and a low loss of organic materials such as sugar and protein prior to feeding the silage to the animal. The methods for ensiling include a step for combining the chemical additive in solid or liquid form with the fodder followed by a fermentation time. The ensilage is preferably kept in a silo for at least three weeks before it is consumed to allow for sufficient fermentation.

The invention of Bertram, et al., U.S. Pat. No. 4,042,716 is also directed to a preservative for fodder, mixed fodder and silage against the undesired action of micro-organisms such as bacteria, yeast and mold fungi. The objective is to increase the storage stability of fodder, mixed fodder and silage having appreciable water content. Fodder and mixed fodder having water contents up to about 16% are of limited storage stability, while those with greater water contents are quickly spoiled. Drying fodder is only possible to a limited extent and is often uneconomical. Hence, Bertram '716 discloses fodder, mixed fodder or silage containing acrylic acid, methacrylic acid or an ester or salt of acrylic acid or methacrylic acid in an amount effective to preserve said fodder, mixed fodder or silage. A hexamethylenetetramine salt of acrylic or methacrylic acid is disclosed as a preservative. The preservatives are mixed as solids with the fodder, mixed fodder or silage or, preferably, are added as liquids. Again, in all cases, water is present to serve as a medium for the preservative action. Additionally, a storage or fermentation time is inherently used prior to feeding the fodder, mixed fodder or silage to the animal.

Burroughs, et al. U.S. Pat. No. 4,186,213 discloses methods of feeding cattle to assure maximized protein utilization comprising feeding the cattle a feed ration containing a plurality of different naturally occurring protein-providing feed materials. At least one of said materials is treated by heat, tannin or an aldehyde chemical stabilizing agent to reduce the water solubility of the protein and protect it against rumen destruction. The protein treatment process employing the chemical stabilizing agents involves application of the chemical agent in a water solution. A water solution in the amount of 2% to 50% by weight of the chemical agent based upon the dry weight of the feed material being treated is suitable. Typically, soybean meal is treated with a 7% aqueous solution supply of formaldehyde equal to 0.4% or 0.6% of the meal dry matter. The treated meal is then permitted to react a minimum of 12 hours before incorporation into cattle diets. Examples of effective aldehydes are formaldehyde, glyoxal and glutaraldehyde. Burroughs '213 provides reference to a paper by Schmidt, et al.: "Effects of Formaldehyde, Glyoxal or Hexamethylenetetramine Treatments of Soybean Meal on Nitrogen Utilization and Growth in Rats and In Vitro Rumen Ammonia Release." *J. Animal. Sci.* 1973, 37:1238. This study utilized concentrated aqueous solutions of chemicals sprayed onto soybean meal, followed by mixing and air drying for one week before incorporation into experimental diets. This study reported inconclusive results with hexamethylenetetramine pretreatment of soybean meal to protect it against rumen destruction. Moreover, in a test of the effectiveness of methenamine to serve as a potential source of ammonia which could be utilized in the rumen for microbial synthesis, this study reported that only about 3% to 4% of the "potential ammonia" from hexamethylenetetramine was released during the three-hour in vitro model rumen fermentation and that no conclusions could be drawn regarding model rumen metabolism of hexamethylenetetramine. The authors concluded at most that hexamethylenetetramine will chemically bind soybean proteins and its potential usage for use in ruminants in a chemical pretreatment process warrants further investigation.

Pais, et al., U.S. Pat. No. 4,482,550 discloses fodder and fodder additives promoting the weight increase of domestic animals and a process for the use thereof. The fodder and fodder additives contain stable complexes of titanium. Optional preservative compounds can be added to protect the stability of the water-soluble titanium complexes against oxidation and microorganisms in a wet environment or under high atmospheric humidity. Hexamethylenetetramine is disclosed as one such preservative compound.

Thus, methenamine or hexamethylenetetramine has been used as a chemical stabilization agent against acid and heat-induced degradation, as a preservative pre-treatment for wet fodder and silage and as a chemical pre-treatment agent for protein-based feed materials to reduce the water solubility of the protein and protect it against rumen destruction.

SUMMARY OF THE INVENTION

One aspect of the invention is a method for enhancing digestion, growth, production and health and for preventing disease in a ruminant or other animal or man comprising feeding methenamine in dry solid or powder form to said animal or man. In one embodiment of the method for enhancing digestion, growth, production and health and for preventing disease in a ruminant or other animal or man, methenamine is added in dry solid or power form to a food or nutrient supplement and said food or nutrient supplement is fed to said animal or man. In another embodiment of the aforementioned method, said digestion is digestion of an animal feed. Preferably, said animal feed is selected from a group comprised of a grain, silage, hay, straw, pasture forage, gin waste, paper, cannery waste, or milk. In another embodiment of the method comprising adding methenamine in dry solid or powder form to a food or nutrient supplement and feeding said food or nutrient supplement to said animal or man, said digestion is digestion of human food. In another embodiment in the method comprising adding methenamine in dry solid or powder form to a food or nutrient supplement and feeding said food or nutrient supplement to said animal or man, enhancing said digestion produces more nutrient utilization. Preferably, said nutrient is a vitamin or mineral. In another embodiment of the method comprising adding methenamine in dry solid or powder form to a food or nutrient supplement and feeding said food or nutrient supplement to said animal or man, said growth is weight gain, muscle or rumen development. In another embodiment of the method comprising adding methenamine in dry solid or powder form to a food or nutrient supplement and feeding said food or nutrient supplement to said animal or man, said production is meat, milk, milk proteins, milk fat, butterfat, wool, eggs, larger offspring such as calves, work, or speed. In yet another embodiment of the method comprising adding methenamine in dry solid or powder form to a food or nutrient supplement and feeding said food or nutrient supplement to said animal or man, said health is energy, strength, activity, endurance or body or hair condition. In yet another embodiment of the method comprising adding methenamine in dry solid or powder form to a food or nutrient supplement and feeding said food or nutrient supplement to said animal or man, said disease is stomach acid production, upset stomach, acidosis, stress, displaced abomasum, acetonemia, depot fat, stiff joints, arthritis, rough skin, diarrhea, colds, pneumonia, calf mortality or dry, off-color hair.

In another aspect of the invention, a composition is provided comprising methenamine for nutritional supplementation for an animal or man employing the method of the invention for enhancing digestion, growth, production and health, and for preventing disease in a ruminant or other animal or man comprising feeding methenamine in dry solid or powder form to said animal or man. In another aspect of the invention, a composition is provided comprising methenamine for an animal or man employing the method of the invention comprising adding methenamine in dry solid or powder form to a food or nutrient supplement and feeding said food or nutrient supplement to said animal or man. In one embodiment of the composition comprising methenamine for an animal or man employing the method of the invention comprising adding methenamine in dry solid or powder form to a food or nutrient supplement and feeding said food or nutrient supplement to said animal or man, said animal is a ruminant animal and said food comprises from 0.000001 w/w% to 0.002642 w/w% methenamine. In another embodiment of the composition comprising methenamine for an animal or man employing the method of the invention comprising adding methenamine in dry solid or powder form to a food or nutrient supplement and feeding said food or nutrient supplement to said animal or man, said food comprises molasses and from 0.6608 w/w% to 0.8810 w/w% of methenamine. In another embodiment of the composition of the invention comprising methenamine for an animal or man employing the method of the invention comprising adding methenamine in dry solid or powder form to a food or nutrient supplement and feeding said food or nutrient supplement to said animal or man, said animal has a cecum and said food comprises from 0.000000366 w/w% to 0.000732 w/w% methenamine. In another embodiment of the composition of the invention comprising methenamine for an animal or man employing the method of the invention comprising adding methenamine in dry solid or powder form to a food or nutrient supplement and feeding said food or nutrient supplement to said animal or man, said composition comprises from 0.000002202 w/w% to 0.004404 w/w% methenamine. In another embodiment of the composition of the invention comprising methenamine for an animal or man employing the method of the invention comprising adding methenamine in dry solid or powder form to a food or nutrient supplement and feeding said food or nutrient supplement to said animal or man, said animal is a dairy cow, said composition is said nutrient supplement comprising 2.4 grams methenamine and 9.6 grams of conventional nutrients and said feeding is feeding 12 grams of said nutrient supplement per cow per day. In another embodiment of the composition of the invention comprising methenamine for an animal or man employing the method of the invention comprising adding methenamine in dry solid or powder form to a food or nutrient supplement and feeding said food or nutrient supplement to said animal or man, said animal is a horse, said composition of said nutrient supplement comprising 0.44 grams methenamine and 27.935 grams of conventional nutrients in said feeding is feeding 1 ounce of said nutrient supplement per horse per day. In another embodiment of the composition of the invention comprising methenamine for an animal or man employing the method of the invention comprising adding methenamine in dry solid or powder form to a food or nutrient supplement and feeding said food or nutrient supplement to said animal or man, said animal is a dog and said composition of said nutrient supplement comprises 126.66 grams methenamine and dog food pre-mix excipients. In another embodiment of the composition of the invention comprising methenamine for an animal or man employing the method of the invention comprising adding methenamine in dry solid or powder form to a food or nutrient supplement and feeding said food or nutrient supplement to said animal or man, said nutrient supplement is for man and comprises 0.35 grams methenamine and 0.36 grams dextrose and said feeding is feeding 0.71 grams of said nutrient supplement per man per day. In another embodiment of the composition of the invention comprising methenamine for an animal or man employing the method of the invention comprising adding methenamine in dry solid or powder form to a food or nutrient supplement and feeding said food or nutrient supplement to said animal or man, said animal is a calf, said composition of said nutrient supplement comprises 56.75 grams methenamine and 851.25 grams Lawley's "TOP CALF" nutrients and said feeding is feeding 4.54 grams said nutrient supplement per calf per day. In another embodiment of the composition of the invention comprising methenamine for an animal or man employing the method of the invention comprising adding methenamine in dry solid or powder form to a food or nutrient supplement and feeding said food or nutrient supplement to said animal or man, said animal is a calf, said composition of said nutrient supplement comprises 118.4 grams methenamine and 789.7 grams Lawley's "CALF RANCH SPECIAL" nutrients and said feeding is feeding 4.54 grams said nutrient supplement per calf per day.

In yet another aspect of the invention, there is provided a method for preserving a dairy product comprising adding methenamine in dry solid or powder form to said dairy product and sealing said dairy product in a container from the outside air. In one embodiment of the method for preserving a dairy product, said preserving is preserving said dairy product storage stability. In another embodiment of the method for preserving a dairy product, said preserving is preserving said dairy product taste. In another embodiment of the method for preserving a dairy product, said dairy product is selected from the group comprising milk, buttermilk, low-fat milk, skim milk, cream, cheese, or yogurt. In another embodiment of the method for preserving a dairy product, said dairy product is milk comprising 0.56 grams methenamine per gallon of said milk.

In a further aspect of the invention, there is provided a dairy product composition comprising methenamine for preserving said dairy product. In one embodiment of the dairy product composition comprising methenamine for preserving said dairy product, said preserving is preserving said dairy product storage stability. In another embodiment of the dairy product composition comprising methenamine for preserving said dairy product, said preserving is preserving said dairy product taste. In another embodiment of the dairy product composition comprising methenamine for preserving said dairy product, the dairy product is selected from the group comprising milk, buttermilk, non-fat milk, skim milk, cream, cheese, or yogurt. In another embodiment of the dairy product composition comprising methenamine for preserving said dairy product, said dairy product is milk comprising 0.56 gram methenamine per gallon of said milk. In another embodiment of the dairy product composition comprising methenamine for preserving said dairy product, the composition further comprises an acid.

DETAILED DESCRIPTION OF THE PREFERRED EMBODIMENT

The present invention provides as its major object a method for enhancing digestion, growth, production and health and for preventing disease in a ruminant or other animal or man comprising feeding methenamine, also known as hexamethylenetetramine, in dry solid or powder form to said animal or man. Another major object of the invention is a method for enhancing digestion, growth, production and health and for preventing disease in a ruminant or other animal or man comprising the addition of methenamine in dry solid or powder form to a food or nutrient supplement and feeding the food or nutrient supplement to the animal or man. Another object of the invention is to provide compositions comprising methenamine for nutritional supplementation for an animal or man employing said methods. Yet another object of the invention is to provide a method employing methenamine for preserving milk, cream, cheese, yogurt and other dairy products. Yet another object of the invention is to provide dairy product compositions comprising methenamine for preserving said dairy products. The invention is premised essentially on the discovery of the methenamine-induced conversion (digestion and metabolism) of a greater percentage of ingested nutrients for greater growth, weight gains, production, health and prevention of disease for animals and man and greater milk and milk component production for ruminants. The invention is also premised on the discovery that methenamine can preserve and prolong the storage stability and taste of dairy products.

In contrast to earlier uses of methenamine referenced above, it has been discovered that methenamine can be directly and immediately ingested in dry solid or powder dosage forms alone or in combination with other nutrients to produce the aforementioned beneficial growth, health and prevention of disease effects. No additional water is added to methenamine alone or when in combination with other nutrients. A dry solid or powder dosage form is defined for the purposes of the present invention as a dosage form wherein there is insufficient water for chemical interaction of the components or degradation of the components. It has been discovered that there is no need to pre-treat animal feeds to achieve beneficial effects from methenamine. In fact, in prior art uses of methenamine, the chemical properties of methenamine which are responsible for enhancing health or production have either already been utilized instead in preserving the feeds or eliminated by oxidation of the methenamine in the liquid state. The present invention provides simple, one-step methods for employing methenamine for enhancing growth and health and prevention of disease in animals and man which have been completely overlooked by the prior art despite a long-standing need for a safe and effective nutrient supplement and simple method for providing that supplement.

It has been discovered that methenamine provided according to the present invention becomes a part of and improves the fermentation in the rumen of any feed stuff eaten by ruminant animals, assuring more complete digestion and metabolism. This is in direct contrast to prior art uses of methenamine wherein the chemical pre-treatment of ruminant dietary proteins was carried out to protect them from rumen degradation and allow more intact protein to escape to the abomasum and lower digestive tract where they could be more efficiently utilized. The fermentation process within the rumen of the animal is aided by methenamine by a process wherein methenamine releases its nitrogen into the culture of the stomach or rumen. This helps create inertness and helps to provide the most optimal atmosphere (a controlled atmosphere) for the growth of ruminal microorganisms such as yeasts, this atmosphere being composed almost completely of nitrogen, carbon dioxide and ammonia. This atmosphere limits to almost none, the amount of oxygen and oxidation which might be present which would be detrimental to the growth and multiplication of beneficial anaerobic ruminal bacteria. Simultaneously, the growth and multiplication of aerobic bacteria will be controlled, eliminating much of the acids and upset stomachs which keep the animal from properly utilizing the nutrients of the feed. Acidosis is also known to lead to sickness and even death in some cases. Additionally, the need for sodium bicarbonate treatment will be less, equaling a saving for the owner. Inertness of the ingestia aided by the addition of methenamine in the stomach will help to prevent stresses of all kinds. The lack of oxygen in the rumen also prevents oxidation which causes acid formation, or spoilage, and putrefaction because of poor digestion of feeds eaten, such as grains, hay, silage, pasture, straw, cannery waste, gin waste and paper, etc. Methenamine will also prevent undesirable oxidation via a chemical antioxidant process. Oxidation and poor feed utilization will result in poor health, lower weight gain and lower milk production,etc.

As a result of accelerated fermentation, there is more cud chewing and a greater amount of secreted saliva. Saliva contains the enzyme amylase, which acts upon starches, changing them into maltose, and the enzyme maltase, which acts upon maltose, changing it into glucose, which is a sugar that can pass through the membrane of the digestive tract, directly into the blood of the host ruminant.

The acceleration of rumen fermentation also causes an increase in the flow of gastric juices, which are comprised mostly of hydrochloric acid and the enzymes pepsin, amylase and lipase, which act upon the proteins and fatty substances, changing them into polypeptides, higher fatty acids and glycerol.

The intestinal walls secrete juices containing the enzyme peptidase, which acts upon the polypeptides, changing them into dipeptides and amino acids. The best possible amino acid source for ruminant animals are the anaerobic microorganisms which grow and multiply in their rumens at a faster rate and greater numbers when receiving methenamine in their feeds. The amino acid methionine is the most limiting for production in ruminants and cecum animals if they do not receive methenamine. This is because they eat no meat which is high in methionine. With methenamine mixed into the feeds, the amino acid rich soup which passes into the abomasum and gut area of the animal is in such a thin, fine condition (e.g., low viscosity with good wetting and spreading properties) that as it passes along the digestive membrane, it is more easily absorbed and passes into the bloodstream. Since methenamine in the animals' feed helps in the production of amino acids and facilitates more complete entry into the bloodstream, it enables the enzymes in the bloodstream to utilize the amino acids they need in quantities needed. Every cell in the body of all animals has special enzymes that are continually building or repairing cells, using amino acids as their building blocks, and which are more plentiful as a result of methenamine supplementation. The amino acids are present in such abundance that the animals' owners can actually see the improvements in health besides seeing greater production of meat, milk, eggs, wool, etc. The intestinal walls also secrete the enzyme sucrase, which acts upon sucrose, changing it into glucose and fructose, the latter of which although it is low in ruminants, is important nutritionally.

There are also enzymes from the microorganisms in the rumen which are greatly multiplied by the acceleration of rumen fermentation. These enzymes act upon the cellulose, polysaccharides, starches, sugars, fats, proteins and urea nitrogen, changing them into volatile fatty acids, microbial proteins, B vitamins and K vitamins. When combined with other feeds in the rumen, methenamine enhances ruminal action and conversion of the proteins in the feed into complete escape proteins (microbial proteins). These escape proteins pass over to the abomasum and in the total digestion and metabolism process furnish the host animal with greater amounts of needed amino acids for health, cell development and repairs, and production of more meat, milk, other products and work.

Methenamine when mixed into the feed stuff also causes more softness and permeability of hard covers, shells, lignious substances covering the germs and nuclei of the feeds and straws rich in proteins and starches. This also enhances digestion of feeds.

It can be observed that following 3 to 4 weeks after animals receive methenamine in their feed, much less undigested feed will be found in their manure.

Better digestion of grains, forages, hay and silage also means much more usable energy for all the animals. The longer ruminants receive this accelerator of rumen fermentation in their feeds, the stronger, healthier and more productive they become. Methenamine can be added to directly to ruminant feeds in dry solid or powder form. Conventional mixing and preparation processes can be utilized to prepare the methenamine-containing feeds. These are known in the art. There is no need to wait any period of time prior to feeding the animal the feed containing methenamine. A concentration from about 0.000001% to about 0.002642% by weight of feed can be used. Preferably, methenamine is added in a concentration from 0.00001% to 0.0002642% by weight of feed. Most preferably, methenamine is added in a concentration from 0.0000528% to 0.0001321% by weight of feed. The objective is to provide from about 1.2 to about 2.4 grams of methenamine per 50 pounds of ruminant feed per day. Adult cows eat about 50 pounds of feed per day, therefore about 1.2 to about 2.4 grams of methenamine would be provided per cow per day.

In particular, dry milk cows which have been receiving methenamine in their feed in an amount corresponding to 2.4 grams of methenamine per day have larger than normal calves which are born extremely healthy and active. Dry milk cows which have received methenamine in their ration get up as soon as the calf is born, clean the calf and drop the afterbirth, thereby cleaning themselves and after 2 or 3 days when the milk is clear of garget can go into the milking string. This means they produce saleable milk sooner making more profits for their owners. Dry cows which have received methenamine in their feed will also have much less displaced abomasums. Dry cows receiving methenamine in their feeds before and after they enter the milking string peak higher than average. The cows which received methenamine in their feed before freshening and after freshening shall not only peak higher, they shall also hold that peak longer than usual. The cows receiving methenamine in their feeds not only hold their peak of more milk longer, they are also producing more of the milk protein and butterfat components and holding up longer. It is also obvious that the cows receiving methenamine are getting more nutrients from the feeds they eat because there is less feed passing out undigested in their feces. As milk cows give less milk they are moved into lower strings where they are given less feed which also has methenamine in it. In this case their production remains higher than others which did not receive methenamine in their feeds. The cows in these lower milk production strings also maintain better body condition than cows before feeding methenamine.

Regular usage of methenamine as a dietary supplement will result in better health throughout the herd, with much better feed conversion, a higher 305-day milk production and much more profits over feed, medicine, veterinarian, cow mortality and culled cow cost. Tail-enders and dry cows will condition better without excessive fat, greatly lowering the possibility of Acetonemia (ketosis) after freshening and suffer much less from stress. Weaned calves and developing heifers which receive methenamine are helped to rapidly develop their rumens, which causes them to grow more rapidly and begin to develop long frames with deep barrels, being very muscular and aggressive eaters. Developing heifers will continue this growth, whether they are eating from bunkers or good pastures, so long as they are able to obtain the methenamine in some feed form. Heifer development is a very important part of any dairy or beef operation, because they will become the cows of the future. Heifers having better health-will breed and calf easier, and become better cows.

Cattle when out to pasture or on the range should receive methenamine in either feed or molasses licks. The amount of methenamine to be used in cattle feed in this case is the same as specified previously. Methenamine can be added to molasses licks in a concentration from about 0.6608% to about 0.8810% by weight of the molasses lick. The methenamine-containing molasses lick is prepared in the following manner: dry solid or powdered methenamine is added along with a standard molasses hardening agent to the raw, viscous molasses syrup and stirred with conventional mixing and blending. The final product is placed in a drum or other suitable container. Cattle should be provided with about 0.5 to about 1.0 pounds of molasses lick per day. These animals will digest grasses and straws so much better, they will achieve much more weight gains and other gains from it. Dairymen or ranchers will find that there is not even enough fiber in the manure piles to hold them together. Beef cattle which have received methenamine while out on pasture will later only need to increase their marbling while in the feed yard for finishing because they will already be plump with muscle, which will be tender because of rapid growth. These animals when butchered will have much less than normal depot fat, and will produce many more pounds of edible meat per 100 pounds. Feed yards for beef should also have methenamine in their feed rations, which will cause them to get more efficient gains, producing tastier, leaner, more tender and healthier meat.

Horses, rabbits, guinea pigs and hamsters have cecums and enlarged colons rather than rumens. Their digestive systems also have large populations of beneficial bacteria, thus they too can utilize methenamine for more gains and health. Horses which receive methenamine in their feed are calmer in the stable but exhibit more speed and stamina when needed. Methenamine can again be added directly to feeds in dry solid or powder form. Conventional mixing and preparation processes can be utilized as before to prepare the methenamine-containing feeds. There is again no need to wait any period of time prior to feeding the animal the feed containing methenamine. A concentration from about 0.000000366% to about 0.000732% by weight of the feed can be used. Preferably, methenamine is added in a concentration from 0.00000366% to 0.0000732% by weight of feed. Most preferably, methenamine is added in a concentration from 0.0000183% to 0.0000366% by weight of feed. The objective is to provide from about 0.0005506 to about 0.0011012 grams of methenamine per kilogram animal body weight per day.

Pigs, dogs, minks, fish, monkey and man have the most simple of all digestive systems consisting of the mouth, associated glands, esophagus, stomach, small intestine, large intestine, pancreas and liver. Because of the release of nitrogen, methenamine produces inertness and an antioxidant state which results in greater nutrient availability for digestion, thereby helping health and stimulating their growth. Methenamine can again be added directly to feeds in dry solid or powder form. Conventional mixing and preparation processes can be utilized as before to prepare the methenamine-containing feeds. There is again no need to wait any period of time prior to feeding the animal the feed containing methenamine. A concentration from about 0.000002202% to about 0.004404% by weight of the feed can be used. Preferably, methenamine is added in a concentration from 0.00002202% to 0.0004404% by weight of feed. Most preferably, methenamine is added in a concentration from 0.0001101% to 0.0002202% by weight of feed. The objective is to provide the preferred dosage of metheneamine which is in the range from about 0.05 to about .0005 grams of methenamine per kilogram animal body weight per day, more preferably from about 0.01 to about .001 grams per kilogram animal body weight per day, and most preferably about 0.0035 grams of methenamine per kilogram animal body weight per day.

Methenamine has also been found to be an excellent antioxidant nutritional supplement for other animals.

Responses to vitamins are sooner, faster and greater as a result of the antioxidant action. Naturally occurring amino acids in the feeds of animals are more completely preserved and utilized.

The diets of most people contain enough good quality proteins that if they receive enough vitamins and trace elements (minerals), their growth and development is quite good. However, this is not the case for many people, especially older people. People who take methenamine have better than average health as a result of receiving more natural unoxidized vitamins and proteins (i.e., amino acids and enzymes).

If one has particular health problems before taking methenamine, many of the problems might disappear and some others will improve. For example, old people's joints shall become more limber and the skin becomes smoother and softer in time. Methenamine, when taken with the diet of a man or other animals, can help ease the pain of arthritis disease for those who have it and prevent the disease in others. Evidence of this disease has been observed in human skeletons over 40,000 years old, and even in the skeletons of dinosaurs. Arthritis is inflammation of a joint, or joints, which have in some way received damage from some function, work, sport, accident or another problem such as an autoimmune reaction. The fluids, amino acids and enzymes needed for prevention or repairs were not supplied to the construction and repair enzymes in either quantity or quality needed, nor in time to stop wear of the cartilage or hyaline which consists of a clear matrix with nucleated cells coating the ends of the bones. This coating is transparent, appearing glassy and smooth. The nucleus of the cell consists of a mass of protoplasm and is necessary to such functions as growth and cellular reproduction. Protoplasm consists largely of water, proteins (amino-acids), lipids (fats), carbohydrates and inorganic salts. Cartilage has no blood supply. It has its own fluid called synovial fluid. The action of synovial fluid to squeeze waste out of the cartilage and allow it to take in more nutrients is a function of weight, activity and other variables. The large abundance of fluids, amino-acids, lipids, carbohydrates, inorganics and enzymes available in the bloodstream produced as a result of the methenamine will in turn result in a rapid flow of these to the cartilage, (hyaline) and thus new cells will grow to replace the worn out ones. So long as methenamine is received the repair and replacement of cells in the matrix covering the ends of the bones will continue, and therefore arthritis will not develop in an individual free of the disease.

In tests performed on several people with arthritis, including a 77 year old male, it has been found that when methenamine was included in the diet in an amount of 0.35 grams per day, the amino-acids and enzymes were available in such larger amounts that the individuals became more comfortable, and after a few days suffered no pain sleeping through the night.

The Encyclopedia Britannica states that vitamins are specific organic compounds required in the diet in very small amounts (0.00002% to 0.005%). It also states that in the absence of sufficient amounts of any one of these substances growth failure of these young animals occurs, and specific pathogenic changes recognizable as disease develop in both immature and adult individuals. The Encyclopedia Britannica also states that naturally occurring disease in man and other animals result from insufficient intake of one or more vitamins and are termed vitamin deficiency diseases. It also states that whole green plants manufacture all the vitamins they need for themselves, and manufacture some vitamins they do not need for themselves. It further states that the fact that yeast may require the same vitamins as man greatly facilitates recognition of certain vitamins.

Methenamine acts in the manner of a co-enzyme causing better utilization of vitamins and micronutrients and elements. Methenamine also functions in the feeds or foods of all animals and people as a vitamin-like substance aiding in better digestion and metabolism resulting in more growth and greater production of meat and milk. Methenamine acts as a vitamin which promotes growth in small amounts from (0.0044%) or less of the diet of man or other animals having the simplest digestive systems. It also prevents diseases which are brought on by this vitamin deficiency. Methenamine aids in the growth and multiplication of yeast and other beneficial bacteria. This vitamin-like substance appears to be plentiful in plants if eaten raw and perhaps in raw beef. It appears that cooking, extensive processing or drying destroys much of the methenamine. Thus, while conventional methods for compounding vitamins and other dietary supplements can be employed, excessive heat, processing or drying should be avoided.

It has been found that when 0.000 321% (by weight of the total diet) of methenamine is added to the diet, it is sufficient for ruminants. An amount of 0.0000638% (again by weight of total diet) is sufficient for calves which are not yet ruminants, but have a digestive system like the pig or man.

Consider a calf being raised by its dam (mother) out at pasture. The calf suckles several times a day. The mother cow licks, or grooms the calf as the calf feeds. The cow, a ruminant, spends about eight (8) hours every day regurgitating and chewing her cud—contents from the rumen which are the feeds she has eaten. As the cow licks the calf, she deposits enzymes, microorganisms (yeasts) and saliva vitamins, both natural from the pasture and any others which might have been fed to the cows. The cow has also licked her udder and around and near it. The calf licks around and nuzzles the udder after feeding and at times throughout the day licks itself. These calves grow very fast, become quite large and are almost never sick. The calf in it's natural behavior described above picks up enzymes, vitamins, amino-acids and minerals and has a very low death rate of 1% to 3%.

Compare the above calves to the calves raised by man—such as dairy calves. Man removed the calf from the cow and feeds it milk from a bottle or bucket and it never sees it's dam again after it is born. This calf grows very slowly and is prone to become sick with scours (diarrhea), colds and pneumonia. The average death rate is over $20\%$. It appears that the missing vitamin causing the previously mentioned natural prevention of death must be present in the grasses the cow eats.

It has been proven by initial trials that if methenamine is added to the milk in a concentration of about 0.28375 grams per ½ gallon of milk and directly provided to the calf without the need for a standing time, the calf will grow equally as well as the calf which nurses it's dam and the mortality rate shall be from less than 1% to as high as 5%, the difference being from management and sanitation.

Most dairies have large quantities of fresh and "hospital" (mildly sick cows for various reasons) cow milk they use, or could use to feed their calves. Because of rapid bacteria growth and spoilage much of this milk must be dumped, or has had enough bacteria growth by the time it is fed that it causes scours which many times lead into pneumonia and possible death. If methenamine is put into this milk right away, it will—because of the nitrogen release, keep the milk in its fresh state for many extra hours. Thus the storage stability and shelf life will be lengthened and the taste will be preserved. The methenamine will produce enough nitrogen in the headspace of the container such that the oxidation activity of the oxygen will be neutralized. Fresh pasteurized or raw milk if put into tanks, drums or any container which can be sealed from outside air can be kept fresh for indefinite time, so long as methenamine has been added before sealing the container. The container need not be gas impermeable, however, the more gas impermeable, the better. As the methenamine dissolves and establishes an inert headspace, this enables one to ship fresh milk into countries to feed malnourished and starving children and to personnel in the armed forces regardless of where they are. Methenamine can be added directly to milk in dry solid or powder form. Conventional mixing and preparation processes can be utilized to prepare the methenamine-containing milk. Preferably, the milk container is sealed immediately following the addition of the methenamine to maximize the creation of an inert headspace in the gas volume of the container. Standard milk containers with the standard headspace volume can be employed. There is no need to use a container with a smaller headspace. The container can also be sealed after the complete dissolution of the methenamine with stirring. The container can also be sealed after final processing of the milk. There is again no need to wait any period of time prior to using the milk. Methenamine can be used to preserve whole, skim or other milk products such as buttermilk and milk with 1% or 2% fat. A concentration of methenamine from about 0.01 grams to about 1.5 grams per gallon of milk can be used. Preferably, from approximately about 0.05 gram to about 1.0 grams methenamine per gallon of said milk; more preferably, methenamine is added in a concentration from about 0.10 grams to about 0.8 grams per gallon of milk is used; still more preferably, methenamine is added in a concentration from about 0.25 grams to 0.75 grams per gallon of milk, and most preferably about 0.56 grams per gallon. Generally, the amount of methenamine to be employed for the preservation of milk products is dictated by the need to employ a non-toxic amount and an amount which produces the desired shelf-life and taste preservative properties. This amount can be determined by conventional techniques.

Additionally, it is preferable to add an amount of an organic acid such as citric acid to an alkaline or neutral dairy product such as milk along with the methenamine, as this further enhances the stability of the dairy product. A variety of other conventional non-toxic food grade acids can be employed, such as ascorbic acid, tartaric acid and the like. The amount of acid to add can be determined by routine stability testing as well as by known safe amounts which can be added to foods. Generally, a weight amount of acid corresponding to about 25% of the weight of methenamine can be added.

Methenamine can also be used in milk which is later to be fermented and used for making hard cheese without the use of rennet which coagulates the proteins. The fresh qualities and taste may be preserved and the cheese made with much less salt (sodium) and without undesirable taste and odors. The same concentration of methenamine and method of preparation can be used for this milk as for other milk described above. Methenamine can also be utilized with the foregoing methods and concentrations to preserve the shelf stability and taste of other dairy products such as cream, yogurt and other cheeses. The appropriate concentrations of methenamine to be used for other dairy products can be discerned from conventional experimentation techniques for evaluating product safety and stability. Alternatively, the amount of methenamine to be used for other dairy products can be based upon the amount of milk used to make the dairy product. In the latter case, the same concentration for preserving milk can be used.

The following examples are provided by way of illustration only and are not intended as limitations of the present invention, many apparent variations of which are possible without departing from the spirit and scope thereof.

EXAMPLE 1

Digestion metabolism enhancer for dairy cows. Dairy cows received 12 grams daily of a digestion metabolism enhancer composed mostly of amino-acid bearing nutritional products plus methenamine (hexamethylenetetramine (Hex)).

This 12 grams is as follows:

| | |
|---|---|
| Hex - | 2.4 grams |
| Other nutritional products - | 9.6 grams |
| Total: | 12.0 grams per cow - per day |

Other nutritional products include conventional nutrients such as vitamins, minerals, electrolytes, carbohydrates, protein-based products and fatty substances. Conventional compounding and formulation excipients such as buffers can also be employed. The material was prepared according to conventional mixing procedures and then mixed with the feed, again with conventional mixing procedures. Cows were provided the feed with the digestion metabolism enhancer immediately following mixing with the feed. The following health benefits were observed: Dry cows freshen in better body condition and have healthier, larger calves. The cows clean better after calving and have almost no displaced abomasums. Cows go into the milking stringer sooner than before. Milking cows do not exhibit as much lameness as before. Milking cows are better able to cope with stresses, such as hot weather, strangers in the milking barn, construction work, etc. Cows do not tail off in milk production as soon or as fast as before. The body condition and overall health of even the tail-enders is excellent. Veterinarian bills and medications are down. The vitamin-like actions of the hexamethylenetetramine composition and resulting better digestion and metabolism are the reasons for these observations. Additionally, cows after milking 150 days and more, have always visibly shown vitamin deficiencies regardless of the amount of vitamin mix fed them. These cows would appear tired, listless, and their hair would be standing upon the neck and withers. The hair color has become off-color, looking dry, dirty and unhealthy. The same cows that have been receiving Hex in their feed walk and move like they feel good, and their hair is shiny and distinctive in colors.

EXAMPLE 2

Nutrient supplement for horses containing methenamine (hexamethylenetetramine). Feeding Directions:

| | |
|---|---|
| Foals: | ½ oz. per head - per day |
| Idle Horses: | ½ oz. per head - per day |
| Working Horses: | 1 oz. per head - per day |

Horses receiving 1 oz. per head—per day of a nutrient supplement containing hexamethylenetetramine would receive the following:

| | | |
|---|---|---|
| Hex: | 0.44 grams | |
| Other nutrients | 27.935 grams | |
| Total: | 28.375 grams | |

Other nutrients include protein-based products, carbohydrates, vitamins electrolytes and buffers. Other nutrient products from other conventional nutrient classes can also be employed. The material was prepared according to conventional mixing procedures and then mixed with the feed, again with conventional mixing procedures. Horses were provided the feed with the nutrient supplement immediately following mixing with the feed. Horses exhibit more than normal energy and stamina and horse owners say the vitamins show more results in shiny hair coat, bright clear eyes and soft textured skin.

Race horses which are normally excitable and pawing or chewing on things and stress easily are actually quite calm in the stable after receiving the nutrient supplement. However, when they go out on the race track they spring to action, doing better than ever before.

EXAMPLE 3

Dog food pre-mix containing methenamine (hexamethylenetetramine). A pre-mix can be supplied to the dog food manufacturer which will provide the ingredient Hex as indicated per pound of finished dog food—based on dry dog food. The finished dog food would contain 0.0001395% Hex, corresponding to 0.06333 grams Hex per pound of finished dry dog food. The pre-mix package for 2,000 lbs. dog food would contain 126.66 grams of Hex along with conventional dog food pre-mix excipients. The material was prepared according to conventional mixing procedures and then mixed with the dog food, again with conventional mixing procedures. Dogs were provided the dog food with the pre-mix supplement immediately following mixing with the dog food.

Results show that pups grow more rapidly and adult dogs are more eager eaters, healthy and more vigorous.

EXAMPLE 4

Nutrient supplement for man including methenamine (hexamethylenetetramine). Given the ordinary diet, including vitamins taken regularly, a daily nutrient supplement containing Hex blended with dextrose at approximately 50% each can be taken. Conventional methods for preparing capsules were employed. 1 Cap a day of the following composition is recommended and ingested in the ordinary manner:

| Contents: | Hex | 0.35 grams |
|---|---|---|
| | Dextrose | 0.36 grams |

The many aches and stiffness of age are greatly relieved soon after the person starts taking the product. People get a feeling of well-being and feel more like exercising and taking walks. Older people whose arms and shoulders become thin and bony are surprised to discover their arms and shoulders becoming much fuller and more muscular. The skin on the arms, hands and legs becomes smoother and softer.

EXAMPLE 5

Milk for calves comprising "Top Calf" amino acid supplement plus methenamine (hexamethylenetetramine):"Top Calf Supreme". Top Calf is a commercially-available non-medicated amino acid supplement for calf milk. It is available from Lawley's Inc. in Modesto, California. Top Calf supplements the milk fed to calves with needed amino acids. Amino acids are the building blocks of protein needed for building healthy cells for bones, muscle, and all tissues of the body. This supplement is also high in all the B complex vitamins which are not contained in milk after colostrum and are needed by the calf for enhanced appetite, metabolism and better growth. Top Calf supplement also contains enzymes which help in the production of other enzymes which, in turn, cause the calf's digestive system to produce more hydrochloric acid, thus causing the curdling and fermentation of the milk. This is very important in controlling pathogenic bacteria which cause diarrhea and other health problems. This becomes even more important when hospital milk is being fed because some of the antibiotics used on these hospital cows kill the organisms which are responsible for fermentation of milk which leads to better digestion by the calf. Enzymes are needed for much more than just curdling and fermentation of milk. Every cell in the body of all animals, including calves, is maintained by a group of enzymes, whether it is cells of bone, muscle, or tissue of any kind. The enzymes within each of these cells are capable of repairing the cell, or of building more cells like it. These enzymes are like cellular construction workers. They take the needed amino acids required by the particular cell, and utilize them to build or repair cellular damage. This demonstrates the importance of the calf's needs for supplements containing quality amino acids—such a supplement is Top Calf. Hexamethylenetetramine can be combined with Top Calf to produce a superior milk supplement for calves (Top Calf Supreme). The following are mixing and feeding directions for the hexamethylenetetramine-containing milk supplement: Use fresh cow, hospital cow, tank milk or milk replacer as calf milk. The amount of Top Calf Supreme to be added per gallon of milk is indicated in Table 1. For example, mix into each 100 gallons of milk—2 lb. of Top Calf Supreme. Mix into each 10 gallons of milk—3.2 ozs.—8 rounded spoons of Top Calf Supreme. Mix into each 5 gallons of milk—1.6 ozs.—4 rounded spoons of Top Calf Supreme. One can immediately feed (if desired) each calf—1/2 gallon of this milk—2 times per day containing the following hexamethylenetetramine composition:

| TOP CALF SUPREME Additive Ingredients | Grams | Grams Per Calf Per Feeding |
|---|---|---|
| Hex | 56.75 | 0.28375 |
| "Top Calf" nutrients | 851.25 | 4.25625 |
| | 908.0 | 4.54 |

4.54 grams/feeding × 200 feedings = 908 g

TABLE 1

TOP CALF SUPREME Amount Per Gallon of Milk

| Gallons of Milk | Pounds | Level Cups | Rounded Spoons | Level Spoons | Half Spoons |
|---|---|---|---|---|---|
| 100.0 | 2.0 | 6.0 | | | |
| 50.0 | 1.0 | 3.0 | | | |
| 25.0 | 0.50 | 1.50 | | | |
| 10.0 | | | 8.0 | 10.0 | |
| 5.0 | | | 4.0 | | |
| 1.0 | | | 1.0 | | |
| 0.5 = ½ | | | | | Teaspoon 2.0 |

EXAMPLE 6

Milk for calves comprising potassium chloride, vitamins and hexamethylene tetramine ("Calf Ranch Special- Supreme"). Calves feeding from their mothers as nature had intended receive very small feedings but many of them per day. Nature has provided the baby calf with the ability to produce enough hydrochloric acid in its digestive system to properly care for such a small amount of ingested milk. However, man utilizes all of the milk produced by the cow and therefore must feed the calves himself. The feedings are not more than two times per day and therefore are quite large.

Calves are often exposed to substantial levels of pathogenic bacteria from direct contact and from the milk they drink. This often results in bacterial scours, or diarrhea. So much fluid may be passed from its body, that the calf becomes dehydrated and may even develop pneumonia and die as a result.

Calves fed ½ gallon twice per day of a milk composition comprised of milk, potassium chloride, vitamins, hexamethylenetetramine and other excipients will return to health. This composition is called "Calf Ranch Special Supreme".

It is essentially a mixture of hexamethylenetetramine and "Calf Ranch Special", an existing nutrient supplement product available from Lawley's, Inc. in Modesto, Calif. In less than seven days feeding of Calf Ranch Special Supreme, calf fecal matter will become very dark in color and quite firm. Additionally, it has been observed that there are virtually no scours in any of the calves which receive this milk composition shortly after birth. Costs for medication, labor and calf mortality can be substantially lowered or eliminated by using this composition which itself costs only 6 cents per feeding.

Mixing and feeding directions: Use fresh cow, hospital cow, tank milk or milk replacer as calf milk. The amount of Calf Ranch Special Supreme to be added per gallon of milk is indicated in Table 2. For example, mix in each 100 gallons of milk—2 lbs. of Calf Ranch Special Supreme. Mix into each 10 gallons of milk—3.2 ozs.—5 rounded spoons. Mix in each 5 gallons of milk—1.6 ozs.—2.5 rounded spoons. One can again immediately feed (if desired) each calf—½ gallon of this milk—2 times per day.

| Calf Ranch Special Supreme Additive Ingredients | Grams | Grams of Ing. Per Calf Day |
|---|---|---|
| Hex | 118.4 | 0.592 |
| "Calf Ranch Special" nutrients | 789.70 | 3.9480 |
| | 908.10 | 4.54 |

4.54 g/calf × 200 calves = 908 g = 2 lbs

TABLE 2

"Calf Ranch Special Supreme" Amount Per Gallon of Milk

| Gallons of Milk | Pounds | Level Cups | Rounded Spoons | Level Spoons | Half Spoons |
|---|---|---|---|---|---|
| 100.0 | 2.0 | 4.0 | | | |
| 50.0 | 1.0 | 2.0 | | | |
| 25.0 | 0.5 | 1.0 | | | |
| 10.00 | | | 5.0 | 6.5 | |
| 5.0 | 1.6 oz. | | 2.5 | 3.5 | |
| 1.0 | | | | 1.0 | |
| 0.5 | | | | | 1.0 |

An exemplary method of preserving milk with methenamine is provided in Example 7 below.

EXAMPLE 7

Milk with methenamine (hexamethylenetetramine) preservative. Milk can be preserved with methenamine by directly adding to raw milk 0.56 grams of dry solid methenamine per gallon of milk and allowing the methenamine to dissolve with gentle stirring. Preferably, the milk container is sealed immediately following the addition of the methenamine to maximize the creation of an inert headspace in the gas volume of the container. The container can also be sealed after the complete dissolution of the methenamine with stirring. The container can also be sealed after final processing of the milk.

What is claimed is:

1. A method for enhancing digestion in a mammal comprising adding a composition consisting essentially of methenamine in dry solid or powder form to a food or nutritional supplement and feeding said food or nutritional supplement to said mammal, wherein enhancing said digestion produces more nutrient utilization.

2. The method of claim 1, wherein said nutrient is a vitamin or mineral.

3. A method for enhancing growth in a mammal comprising adding a composition consisting essentially of methenamine in dry solid or powder form to a food or nutritional supplement and feeding said food or nutritional supplement to said mammal, wherein said growth is selected from the group consisting of weight gain, muscle development, and rumen development.

4. A method for enhancing production in a mammal comprising adding a composition consisting essentially of methenamine in dry solid or powder form to a food or nutritional supplement and feeding said food or nutritional supplement to said mammal, wherein said production is selected from the group consisting of meat, milk, milk proteins, milk fat, butter fat, wool, eggs, larger offspring, work and speed.

5. A method for enhancing health in a mammal comprising adding a composition consisting essentially of methenamine in dry solid or powder form to a food or nutritional supplement and feeding said food or nutritional supplement to said mammal, wherein said health is selected from the group consisting of energy, strength, activity, endurance, body condition and hair condition.

6. A method for enhancing resistance to disease in a mammal comprising adding a composition consisting essentially of methenamine in dry solid or powder form to a food or nutritional supplement and feeding said food or nutritional supplement to said mammal, wherein said disease is selected from the group consisting of stomach acid production, upset stomach, acidosis, stress, displaced abomasum, acetonemia, depot fat, stiff joints, arthritis, rough skin, diarrhea, colds, pneumonia, calf mortality and dry, off-color hair.

* * * * *